United States Patent
Kolavi et al.

(10) Patent No.: US 8,554,528 B2
(45) Date of Patent: Oct. 8, 2013

(54) SYSTEMS AND METHODS FOR SIMULATING FIELDBUS DEVICES

(75) Inventors: Shashi Kumar M. Kolavi, Bangalore (IN); Karanam Sathyanarayan Rao Thippamma Vanisri, Bangalore (IN); Sachin Pargi, Bangalore (IN); Prabu Dheenathayalan, Coimbatore (IN); Vidya Mysore Shivshankar, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 862 days.

(21) Appl. No.: 12/265,891

(22) Filed: Nov. 6, 2008

(65) Prior Publication Data

US 2010/0114548 A1    May 6, 2010

(51) Int. Cl.
*G06F 17/50*    (2006.01)
*G06G 7/62*    (2006.01)

(52) U.S. Cl.
USPC .......................................................... 703/13

(58) Field of Classification Search
None
See application file for complete search history.

(56) References Cited

U.S. PATENT DOCUMENTS

| | | | |
|---|---|---|---|
| 7,334,117 B2 | 2/2008 | Wilson et al. | |
| 7,894,606 B2 | 2/2011 | Eastham | |
| 2004/0078182 A1* | 4/2004 | Nixon et al. | 703/22 |
| 2004/0117166 A1* | 6/2004 | Cassiolato | 703/13 |
| 2004/0193396 A1* | 9/2004 | Jones et al. | 703/22 |
| 2005/0172258 A1* | 8/2005 | Nixon et al. | 717/100 |
| 2010/0004761 A1* | 1/2010 | Flanders et al. | 700/28 |

* cited by examiner

*Primary Examiner* — Suzanne Lo
(74) *Attorney, Agent, or Firm* — Jetter & Associates, P.A.

(57) ABSTRACT

Systems and methods for simulating operations of a Fieldbus system (FS). The FS (200) includes a Fieldbus interface module (FIM) coupled to field devices. The methods involve creating a simulation computer model (SCM) of the FS, generating simulation data records (SDRs), and running simulation software (SS). The SS is installed on a computer system (242), FIM (232, 234), or embedded device (222, 226). The SS simulates at least one operation of the FS. The SS uses at least a portion of the SCM and at least one of the SDRs. The SCM includes functional blocks and interconnections between the functional blocks. The functional blocks represent the FIM and/or field devices. The SDRs include data defining the SCM, a control strategy of the FS, and communication links between the FIM and field devices. The SDRs also include data defining the operating characteristics of the FIM and field devices.

19 Claims, 8 Drawing Sheets

SYSTEMS AND METHODS FOR SIMULATING FIELDBUS DEVICES

BACKGROUND OF THE INVENTION

1. Statement of the Technical Field

The invention concerns control systems and methods for simulating Fieldbus devices.

2. Background

Figure 1:
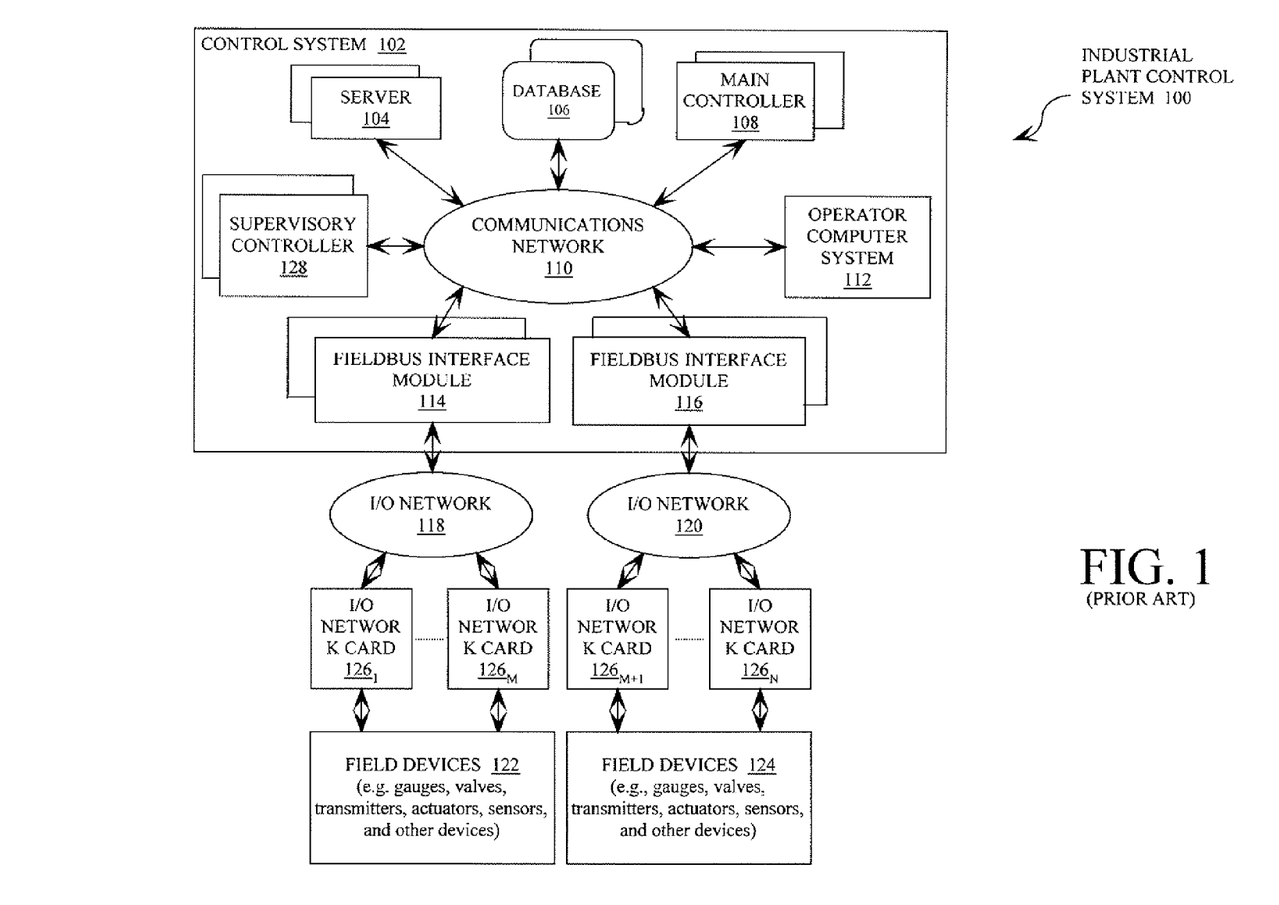
FIG. 1 is a block diagram of a conventional industrial plant control system.

There are many industrial plant control systems (IPCSs) known in the art. One such IPCS is shown in FIG. 1. As shown in FIG. 1, the IPCS 100 is comprised of a control system 102, I/O networks 118, 120, and field devices 122, 124. The IPCS 100 can also be comprised of I/O network cards $126_1, \ldots, 126_N$ residing between the I/O networks 118, 120 and the field devices 122, 124. I/O network cards are well known to those having ordinary skill in the art, and therefore will not be described herein.

The control system 102 typically has a distributed network configuration, i.e., there are application specific modules 104, 106, 108, 114, 116, 128 connected to each other and an operator computer system 112 via a common communications network 110. More specifically, the control system is comprised of a server 104, a database 106, a main controller 108, an operator computer system 112, Fieldbus Interface modules (FIMs) 114, 116, and a supervisory controller 128. The listed devices 104, . . . , 108, 112, . . . , 116, 128 are communicatively connected to each other via the common communications network 110, which may be an Ethernet Network.

The control system 102 is communicatively connected to the field devices 122, 124 via the I/O networks 118, 120. The I/O networks 118, 120 are often Foundation Fieldbus networks. The phrase "Foundation Fieldbus", as used herein, refers to an all-digital, serial, two-way communications system that serves as a network (e.g., a local area network) for industrial distributed network devices 104, . . . , 108, 112, . . . , 116, 128 and field devices 122, 124. The field devices 122, 124 include, but are not limited to, motors, pumps, gauges, valves, transmitters, actuators, boilers, distiller units, and sensors.

Despite the advantages of such a conventional IPCS 100, it suffers from certain drawbacks. For example, the IPCS 100 often includes a large number of devices 114, 116, 122, 124. As such, it is impractical to use the actual IPCS system including all of the above listed devices for purposes of control strategy configuration, operator training, and Factory Acceptance Testing (FAT). For example, the FAT execution is difficult since a portion of the system control resides in the field devices 122, 124. As such, it is logistically impossible to have thousands of field devices 122, 124 shipped to a FAT facility and connected to a control system 102 to test a particular IPCS application. Further, if the actual devices 122, 124 are used in a FAT, then delays in the construction of the IPCS 100 on site may occur.

In view of the forgoing, there remains a need for a practical system and method that can facilitate control strategy configuration, operator training, and Factory Acceptance Testing (FAT). The system and method needs to be capable of simulating some or all of the network elements and devices of the IPCS 100.

SUMMARY OF THE INVENTION

This Summary is provided to comply with 37 C.F.R. §1.73, presenting a summary of the invention briefly indicating the nature and substance of the invention. It is submitted with the understanding that it will not be used to interpret or limit the scope or meaning of the claims.

The present invention concerns systems and methods for simulating an operation of a Fieldbus system. The Fieldbus system comprises at least one fieldbus interface module (FIM) communicatively coupled to a plurality of field devices. The methods involve creating a simulation computer model of a Fieldbus system configuration, generating a plurality of simulation data records, and running simulation software. The simulation software is installed on a computer system, the FIM, or an embedded device. Notably, simulation software installed on a computer system can be the same or different from simulation software installed on a FIM and/or an embedded device. Similarly, simulation software installed on a FIM can be the same as or different from simulation software installed on a computer system and/or an embedded device. Likewise, simulation software installed on an embedded device can be the same as or different from simulation software installed on a computer system and/or a FIM. The simulation software simulates at least one operation of the Fieldbus system. The simulation software uses at least a portion of the simulation computer model and at least one of the simulation data records.

The simulation computer model includes functional blocks and interconnections between the functional blocks. Each of the functional blocks represents a FIM or a field device. The simulation data records include data defining the simulation computer model and at least one control strategy of the Fieldbus system. The simulation data records also include information defining the operating characteristics of the FIM and field devices coupled to the FIM. The simulation data records further include information defining communication links between the FIM and the field devices.

BRIEF DESCRIPTION OF THE DRAWINGS

Embodiments will be described with reference to the following drawing figures, in which like numerals represent like items throughout the figures, and in which.

DETAILED DESCRIPTION

Embodiments of the invention concerns systems and methods for facilitating control strategy configuration, operator training, and Factory Acceptance Testing (FAT) of automated equipment control systems. More specifically, the systems implement methods for simulating at least a portion of the network elements and devices of a control system. The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Before describing the systems and methods of the present invention, it will be helpful in understanding an exemplary environment in which the invention can be utilized. In this regard, it should be understood that the methods of the present invention can be utilized in any application where equipment is to be automatively controlled. Such applications include, but are not limited to, industrial plant control applications, medical applications, security applications, and navigation applications. Accordingly, the methods of the present invention will now be described in relation to one such application, namely, the industrial plant control application.

Exemplary Simulation Systems

Figure 2A:
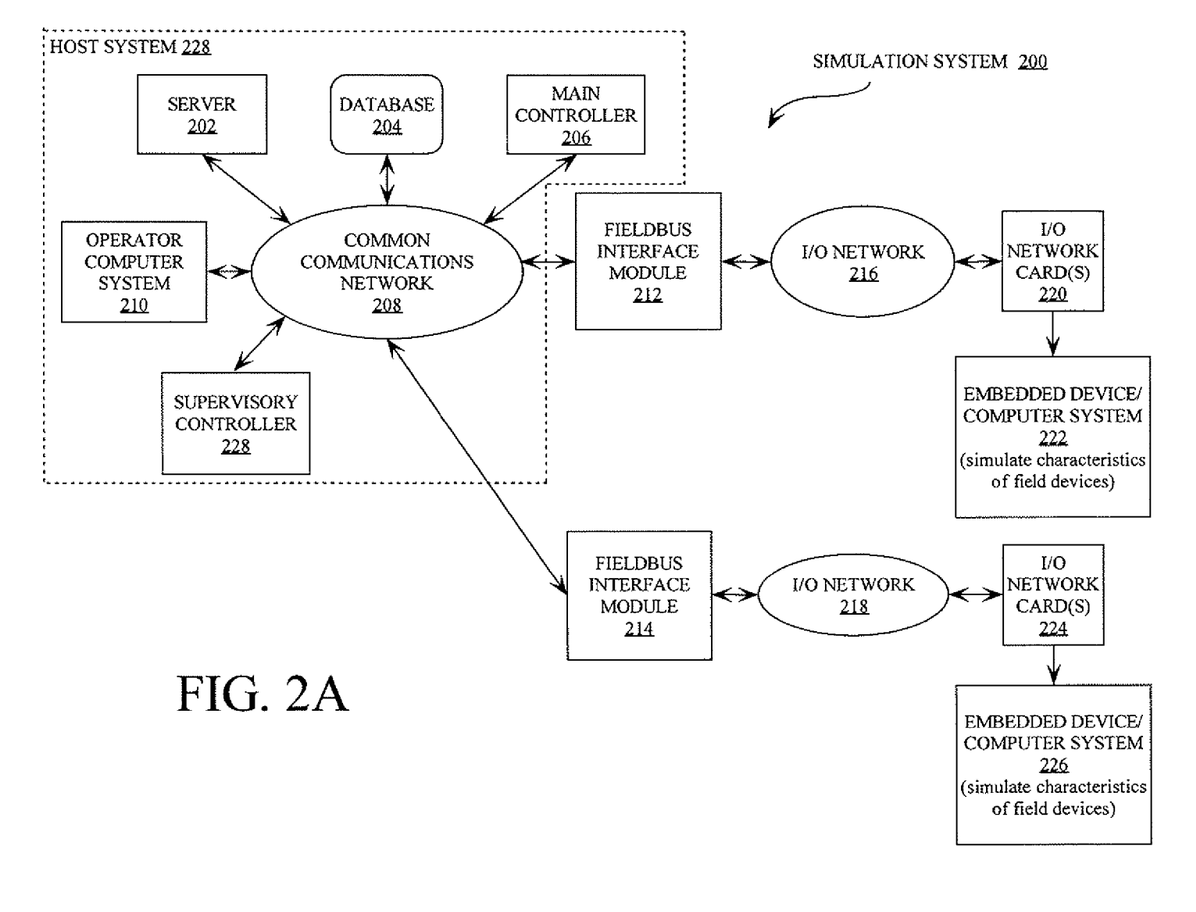
FIG. 2A is a bock diagram of a simulation system according to an embodiment of the invention.

Referring now to FIG. 2A, there is provided a block diagram of an exemplary simulation system 200 according to an embodiment of the invention. As shown in FIG. 2A, the simulation system 200 is comprised of a host system 228 and Fieldbus Interface Modules (FIMs) 212, 214. The host system 228 comprises a server 202, a database 204, a main controller 206, an operator computer system 210, and a supervisory controller 228. It should be noted that redundant devices (not shown) for each of the listed components 202, . . . , 206, 210, . . . , 214, 228 can be provided. The simulation system 200 is also comprised of I/O networks 216, 218, I/O network cards 220, 224, and an embedded device for simulation or a computer system for simulation, hereafter represented as embedded device/computer systems (ED/CSs) 222, 226. The invention is not limited in this regard. For example, the simulation system 200 can be absent of I/O networks 216, 218 and I/O network cards 220, 224. Instead, the simulation system 200 can be comprised of communications links (not shown) of any type known in the art for communicatively coupling FIMs 212, 214 to Fieldbus enabled field devices (not shown).

The listed components 202, . . . , 206, 210, . . . , 214, 228 are communicatively coupled to each other via a common communications network 208. The common communications network 208 can include an Ethernet network. The invention is not limited in this regard. The common communications network 208 can be any type of network selected in accordance with a particular automation process application.

Each of the listed components 202, . . . , 206, 210, 228 is well known to those having ordinary skill in the art, and therefore will not be described herein. However, it should be understood that the operator computing system 210 is configured to facilitate control strategy configuration, operator training, and Factory Acceptance Testing (FAT) of automated equipment. As such, the operator computing system 210 is typically a desktop personal computer system, a laptop personal computer system, a personal digital assistant, a wireless computing device, or any other general purpose computer processing device. Accordingly, the operator computing system 210 includes a user interface (not shown) and a processing device (not shown). The user interface (not shown) is often comprised of a keyboard (not shown), a mouse (not shown), a display screen (not shown), and the like.

The database 204 can comprise process parameter data used by the main controller 206 to control real or simulated automated equipment and/or the supervisory controller 228 to control the main controller 206. Such process parameter data can include, but is not limited to, data defining temperature parameters, data defining timing parameters, and data defining liquid level parameters. The database 204 can also comprise simulation data records and data defining a simulation computer model. The simulation data records and simulation computer model will be described below.

The main controller 206 is comprised of hardware and software configured to manipulate real/simulated automated equipment. As such, the main controller 206 can be communicatively coupled to the ED/CSs 222, 226 via the FIMs 212, 214, I/O networks 216, 218, and I/O network devices 212, 214, 220, 224. The phrase "I/O network" as used herein refers to the communications links between FIMs and I/O network cards. The phrase "I/O network card" as used herein refers to an electronic device (a) having digital/analog input/output terminals to which field device input/output terminals are wired and (b) configured for providing an interface between FIMs and field devices.

The I/O network cards 220, 224 are configured to facilitate the transferring of data between a controller (e.g., the main controller 206) and real/simulated field devices. The I/O network cards 220, 224 are also configured to process received data signals to place the same in a form suitable for use by a human and/or a controller (e.g., the main controller 206). For example, if an I/O network card 220 receives a four-to-twenty milliamp analog signal representing a temperature of a liquid contained in a tank, then the I/O network card 220 converts the analog signal into useful data such as (1000 degrees). The invention is not limited in this regard.

Referring again to FIG. 2A, each of the ED/CSs 222, 226 is comprised of hardware and/or software configured to simulate operations of field devices (e.g., field devices 122, 124 of FIG. 1). In this regard, it should be understood that each of the ED/CSs 222, 226 has a simulation software program installed thereon. The simulation software programs are configured to simulate the operations of the field devices (e.g., field devices 122, 124 of FIG. 1). The field devices can include, but are not limited to, motors, pumps, gauges, valves, transmitters, actuators, boilers, distiller units, and sensors.

The simulation software programs use simulation computer models of the field device configurations and simulation data records. Computer models are well known to those having ordinary skill in the art, and therefore will not be described in detail herein. However, it should be understood that simulation computer models demonstrate device configurations of IPCSs (e.g., the IPCS 100 of FIG. 1). More particularly, the simulation computer models illustrate the relationships between the devices of the IPCS (e.g. IPCS 100 of FIG. 1). As such, the simulation computer models comprise functional blocks and interconnections between the functional blocks. Each of the functional blocks represents a particular field device (e.g., field devices 122, 124 of FIG. 1) of an IPCS (e.g., the IPCS 100 shown in FIG. 1).

The simulation data records can comprise data defining the simulation computer model and at least one control strategy employed by components of an IPCS (e.g., the IPCS 100 shown in FIG. 1). The control strategy can be, but is not limited to, a control strategy of an IPCS. The phrase "control strategy" as used herein refers to a combination of events designed to facilitate the performance of an industrial process in accordance with a particular facility and/or government agency plan. For example, a control strategy can include a combination of events performed by a field device, an I/O network card, a FIM, and a main controller for: (a) obtaining a sensed/measured value; (b) determining if the sensed/measured value falls below or exceeds a threshold value; and (c) controlling the field device so that a particular event occurs if its is determined that the sensed/measured value falls below or exceeds the threshold value. The invention is not limited in this regard.

The simulation data records can also comprise data defining operating characteristics of the field devices (e.g., field devices 122, 124 of FIG. 1), field device parameters, and/or communication links between the field devices and I/O network cards. Such data can be obtained from the manufactures of the field devices (e.g., field devices 122, 124 of FIG. 1). Such data is typically contained in one or more device description files (or DD files). DD files are well known to those having ordinary skill in the art, and therefore will not be described herein. The simulation data records can be stored in the database 204, a storage device (not shown) of the operator computer system 210, and/or a storage device (not shown) of an ED/CS 222, 226.

The simulation software program can generate simulation data describing results obtained from simulating the operations of the field devices (e.g., field devices 122, 124 of FIG. 1). Such simulation data can include, but is not limited to, diagnostic data, calibration data, ranges, configurations, information, and default settings.

The FIMs 212, 214 provide connections between the ED/CSs 222, 226 and the host system 228. The FIMs 212, 214 are generally configured to deliver systemwide integration of data access, control, connections, diagnostics, and alarms. In this regard, it should be understood that the FIMs 212, 214 also provide access to diagnostic information generated by the simulation software program installed on the ED/CSs 222, 226. The FIMs 212, 214 can calibrate and monitor the operations of real and simulated FF devices. The FIMs 212, 214 can also provide alerts to flag maintenance notifications, environmental emissions, activation of safety showers, low tank levels, high tank levels, sensor drifts, and the like. The FIMs 212, 214 can be configured to perform control operations for controlling real and simulated field devices.

According to an embodiment of the invention, the main controller 206 is a C300 Process Controller or a C200 Process Controller provided by Honeywell International of Morristown, N.J. The FIM 212 is a Chassis Series-A Fieldbus Interface Module or a Series C Fieldbus Interface Module provided by Honeywell International of Morristown, N.J. Similarly, the FIM 214 is a Chassis Series-A Fieldbus Interface Module or a Series C Fieldbus Interface Module provided by Honeywell International of Morristown, N.J. The Chassis Series A FIM supports up to two Foundation Fieldbus links per module. In contrast, the Series C FIM supports up to four links per module. The invention is not limited in this regard.

Figure 2B:
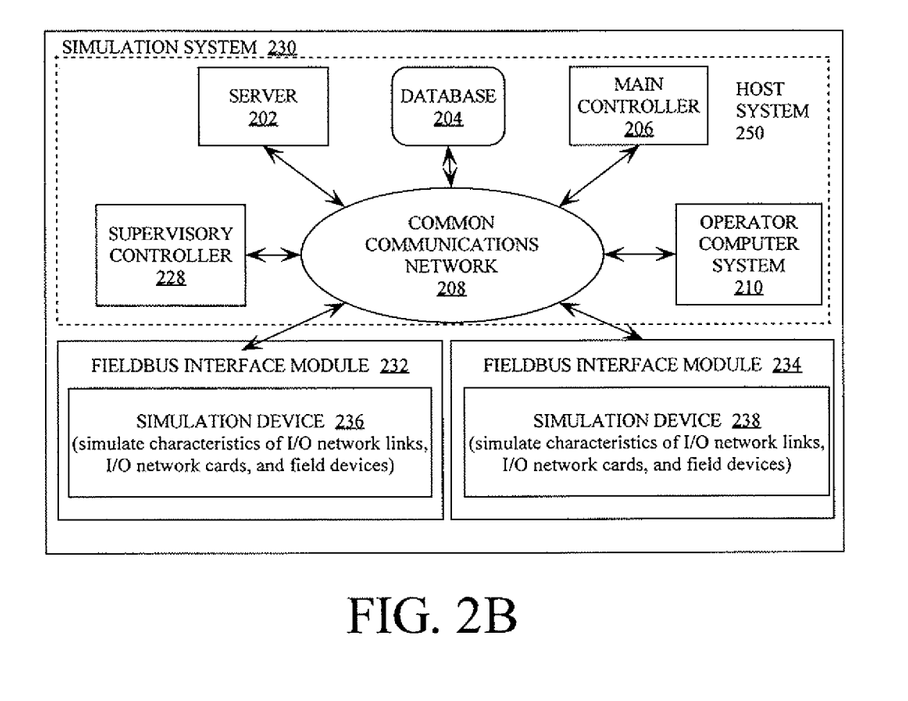
FIG. 2B is a bock diagram of a simulation system according to an embodiment of the invention.

Referring now to FIG. 2B, there is provided another example of a simulation system 230 according to an embodiment of the invention. As shown in FIG. 2B, the simulation system 230 is comprised of a host system 250 and FIMs 232, 234. The host system 250 comprises a server 202, a database 204, a main controller 206, an operator computer system 210, and a supervisory controller 228. These listed components 202, . . . , 206, 210, 228, 232, 234 are communicatively coupled via a common communications network 208. Each of these components 202, . . . , 206, 210, 228 is described above in relation to FIG. 2A. The description provided above is sufficient for understanding the components 202, . . . , 206, 210, 228 of the simulation system 230.

The FIMs 232, 234 provide connections between the host system 250 and real/simulated field devices. The FIMS 232, 234 are generally configured to deliver systemwide integration of data access, control connections, diagnostics, and alarms. In this regard, it should be understood that the FIMs 232, 234 also provide access to diagnostic information generated by the simulation software program installed thereon.

The FIMs 232, 234 can calibrate and monitor the operations of real/simulated field devices. The FIMs 232, 234 can also provide alerts to flag maintenance notifications, environmental emissions, activation of safety showers, low tank levels, high tank levels, sensor drifts, and the like. The FIMs 232, 234 can be configured to perform control operations for controlling real/simulated field devices.

According to an embodiment of the invention, the main controller 206 is a C300 Process Controller or C200 Process Controller provided by Honeywell International of Morristown, N.J. The FIM 232 is a Chassis Series-A Fieldbus Interface Module or a Series C Fieldbus Interface Module provided by Honeywell International of Morristown, N.J. Similarly, the FIM 234 is a Chassis Series-A Fieldbus Interface Module or a Series C Fieldbus Interface Module provided by Honeywell International of Morristown, N.J. The Chassis Series A FIM supports up to two Foundation Fieldbus links per module. In contrast, the Series C FIM supports up to four links per module. The invention is not limited in this regard.

Referring again to FIG. 2B, each of the FIMs 232, 234 is comprised of a simulation device 236, 238, respectively. The simulation devices 236, 238 include hardware and/or software configured to simulate certain operations of an IPCS (e.g., the IPCS 100 shown in FIG. 1). In this regard, it should be understood that each of the simulation devices 236, 238 has a simulation software program installed thereon. The simulation software programs are configured to simulate the characteristics of communications links (e.g., I/O network links), communication network cards (e.g., I/O network cards 126$_1$, . . . , 126$_N$ of FIG. 1), and/or field devices (e.g., field devices 122, 124 of FIG. 1). As noted above, the I/O network links are communication links between FIMs and I/O network cards. As also noted above, I/O network cards are electronic devices (a) having digital/analog input/output terminals to which field device input/output terminals are wired. I/O network cards are configured to provide an interface between FIMs and field devices. The field devices can include, but are not limited to, motors, pumps, gauges, valves, transmitters, actuators, boilers, distiller units, and sensors.

The simulation software programs use simulation computer models (not shown) and simulation data records (not shown). Computer models are well known to those having ordinary skill in the art, and therefore will not be described in detail herein. However, it should be understood that the simulation computer models (not shown) demonstrate device configurations of an IPCS (e.g., the IPCS 100 of FIG. 1). More particularly, the simulation computer models illustrate the relationships between particular devices of the IPCS (e.g. IPCS 100 of FIG. 1). As such, the simulation computer models comprise functional blocks and interconnections between the functional blocks. The functional blocks can represent field devices (e.g., field devices 122, 124 of FIG. 1) of an IPCS (such as the IPCS 100 shown in FIG. 1) and/or communications network cards (e.g., an I/O network card 126$_1$, . . . , 126$_N$ of FIG. 1) of the IPCS. The interconnections can define the communication links (e.g., I/O network links) between the communications network cards (e.g., I/O network cards) of the IPCS (such as the IPCS 100 shown in FIG. 1) and a FIM 232, 234. The interconnections can also define the communications links (not shown) between field devices (e.g., field devices 122, 124 of FIG. 1) of the IPCS (e.g., the IPCS 100 of FIG. 1) and the communications network cards (e.g., I/O network cards 126$_1$, . . . , 126$_N$ of FIG. 1) of the IPCS. It should be noted that if an IPCS is absent of communications network cards, then the functional blocks represent Fieldbus enabled field devices and the interconnections define communications links between FIMs and Fieldbus enabled field devices.

The simulation data records can be stored in the database 204, a storage device (not shown) of the operator computer system 210, and/or a storage device (not shown) of the devices 232, 234. The simulation data records can comprise data defining the simulation computer model and at least one control strategy employed by components of an IPCS (such as the IPCS 100 shown in FIG. 1). The control strategy can be, but is not limited to, a control strategy of the main controller 206, a control strategy of a FIM 232, 234, and a control strategy of the supervisory controller 228. The control strategies can include a combination of events designed to facilitate the performance of an industrial process in accordance with a particular facility and/or government agency plan.

The simulation data records can also comprise data defining operating characteristics of the field devices (e.g., field devices 122, 124 of FIG. 1), operating characteristics of communications network cards (e.g., I/O network cards $126_1, \ldots, 12_N$ of FIG. 1), field device parameters, and/or communications network card parameters (e.g., I/O network card parameters). Such data can be obtained from the manufactures of the field devices and communications network cards (e.g., I/O network cards). Such data is typically contained in one or more device description files (or DD files). DD files are well known to those having ordinary skill in the art, and therefore will not be described herein.

The simulation data records can further comprise data defining the characteristics of communication links between the field devices and communications network cards (e.g., I/O network cards). Similarly, the simulation data records can comprise data defining the characteristics of communication links (e.g., I/O network links) between communications network cards (e.g., I/O network cards) and the FIMs 232, 234. This data can also be obtained from the manufactures of the field devices and communications network cards (e.g., I/O network cards). It should be noted that if an IPCS is absent of communications network cards, then the simulation data records can comprise data defining the characteristics of communications links between Fieldbus enabled field devices and FIMs.

The simulation software program can generate simulation data describing results obtained from simulating the operations of the field devices and/or I/O network cards. Such simulation data can include, but is not limited to, diagnostic data, calibration data, ranges, configurations, information, and default settings.

Figure 2C:
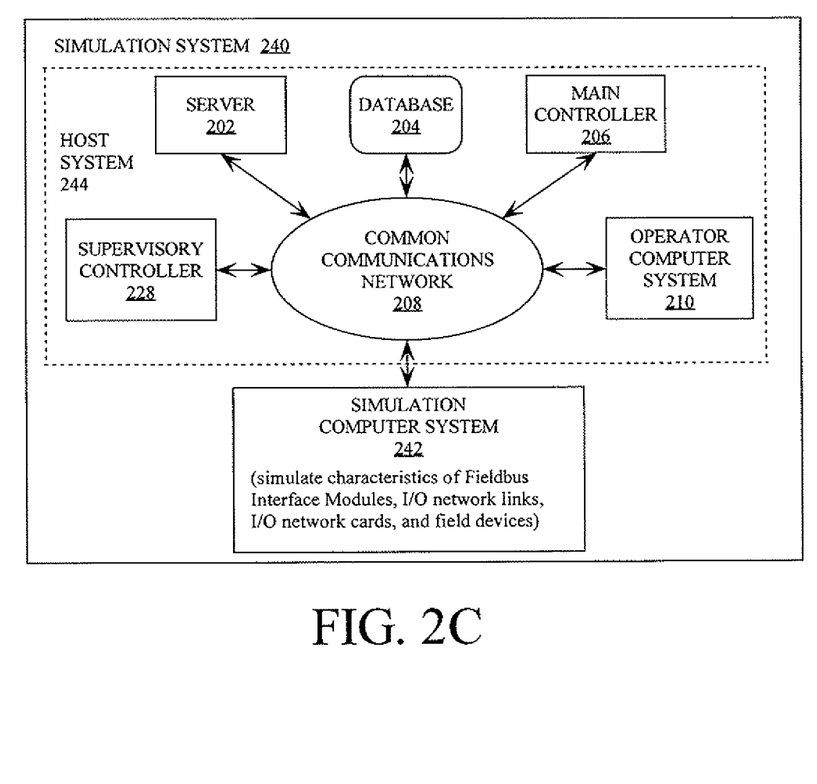
FIG. 2C is a bock diagram of a simulation system according to another embodiment of the invention.

Referring now to FIG. 2C, there is provided yet another example of a simulation system 240 according to an embodiment of the invention. As shown in FIG. 2C, simulation system 240 is comprised of a host system 244 and a simulation computer system 242. The host system 244 comprises a server 202, a database 204, a main controller 206, an operator computer system 210, and a supervisory controller 228. The components 202, . . . , 206, 210, 228, 242 are communicatively coupled to each other via a common communications network 208. Each of these components 202, . . . , 206, 210, 228 is described above in relation to FIG. 2A. The description provided above is sufficient for understanding the components 202, . . . , 206, 210, 228 of the simulation system 240.

Referring again to FIG. 2C, the simulation computer system 242 is configured to facilitate control strategy configuration, operator training, and Factory Acceptance Testing (FAT) of automated equipment. As such, the simulation computer system 242 is typically a desktop personal computer system, a laptop personal computer system, a personal digital assistant, a wireless computing device, or any other general purpose computer processing device.

Figure 3:
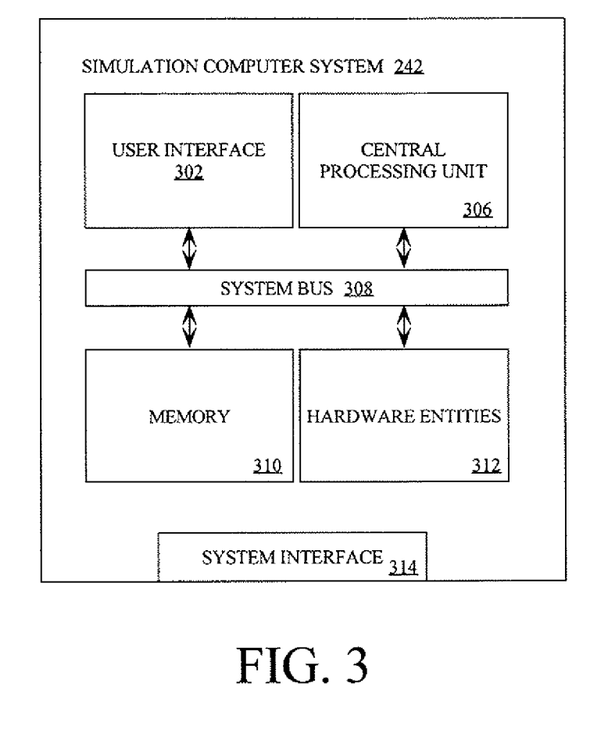
FIG. 3 is a more detailed block diagram of a simulation computer system according to yet another embodiment of the invention.

A more detailed block diagram of the simulation computer system 242 is provided in FIG. 3. As shown in FIG. 3, the simulation computer system 242 is comprised of a system interface 314, a user interface 302, a central processing unit 306, a system bus 308, a memory 310 connected to and accessible by other portions of the simulation computer system 242 through the system bus 308, and hardware entities 312 connected to the system bus 308. At least some of the hardware entities 312 perform actions involving access to and use of the memory 310, which may be a random access memory (RAM), a disk driver, and/or a compact disc read only memory (CD-ROM).

The hardware entities 312 may include microprocessors, application specific integrated circuits (ASICs), and other hardware. The hardware entities 312 may include a microprocessor programmed for simulating at least one operation of an IPCS (such as the IPCS 100 shown in FIG. 1). In this regard, it should be understood that the microprocessor can access and run a simulation software program installed on the simulation computer system 242. Alternatively, the microprocessor can have the simulation software program installed thereon.

The simulation software program can be configured to simulate the characteristics of at least one FIM (e.g., FIMs 114, 116 of FIG. 1), at least one communications network card (e.g., an I/O network card $126_1, \ldots, 126_N$ of FIG. 1), and/or at least one field device (e.g., field devices 122, 124 of FIG. 1). The simulation software program can also be configured to simulate the characteristics of a plurality of communication links (e.g., I/O network links) between FIMs of an IPCS (such as the IPCS 100 of FIG. 1) and communications network cards (e.g., I/O network cards) of the IPCS (such as the IPCS 100 of FIG. 1). The simulation software program can further be configured to simulate the characteristics of a plurality of communications links between the communications network cards (e.g., I/O network cards) of an IPCS (such as the IPCS 100 of FIG. 1) and field devices of the IPCS (such as the IPCS 100 of FIG. 1). The invention is not limited in this regard. For example, if an IPCS is absent of communication network cards, then the simulation software program can be configured to simulate the characteristics of communications links between Fieldbus enabled field devices and FIMs.

The simulation software program can use simulation computer models (not shown) and simulation data records (not shown). Computer models are well known to those having ordinary skill in the art, and therefore will not be described in detail herein. However, it should be understood that the simulation computer models (not shown) demonstrate device configurations of an IPCS (such as the IPCS 100 of FIG. 1). More particularly, the simulation computer models illustrate the relationships between the devices of the IPCS (e.g. IPCS 100 of FIG. 1). As such, the computer models comprise functional blocks and interconnections between the functional blocks. The functional blocks can represent FIMs (e.g., FIMS 114, 116 of FIG. 1), communication network cards (e.g., I/O network cards $126_1, \ldots, 126_N$), and/or field devices (e.g., field devices 122, 124 of FIG. 1). The interconnections can define the communication links (e.g., I/O network links) between the communications network cards (e.g., I/O network cards) of the IPCS (such as the IPCS shown in FIG. 1) and at least one FIM. The interconnections can also define the communications links between field devices and the communications network cards (e.g., I/O network cards). The invention is not limited in this regard. For example, if the IPCS is absent of communications network cards, then the interconnections can define communications links between FIMs and Foundation eneabled field devices.

The simulation data records can be stored in the database 204 (shown in FIG. 2C) and/or memory 310 of the simulation computer system 242. As such, the microprocessor can access the database 204 and retrieve simulation data records therefrom. Similarly, the microprocessor can access memory 310 and retrieve simulation data records therefrom.

The simulation data records can comprise data defining the simulation computer model and at least one control strategy employed by an IPCS (such as the IPCS shown in FIG. 1). The control strategy can be, but is not limited to, a control strategy of the main controller 206 (shown in FIG. 2C), a control strategy of a supervisory controller 228, and/or a control strategy of at least one FIM. The control strategies can include a combination of events designed to facilitate the performance of an industrial process in accordance with a particular facility and/or government agency plan.

The simulation data records can also comprise data defining operating characteristics and device parameters of FIMs (e.g., FIMS 114, 116 of FIG. 1), communications network cards (e.g., I/O network cards $126_1, \ldots, 126_N$), and/or field devices (e.g., field devices 122, 124 of FIG. 1). Such data can be obtained from the manufactures of the FIMs, communications network cards (e.g., I/O network cards), and/or field devices. Such data is typically contained in one or more device description files (or DD files). DD files are well known to those having ordinary skill in the art, and therefore will not be described herein.

The simulation data records can further comprise data defining the characteristics of: (a) communication links between field devices and communications network cards (e.g., I/O network cards); (b) communications links (e.g., I/O network links) between communications network cards (e.g., I/O network cards) and FIMs; and (c) communications links between FIMs and components 202, 204, 206, 210, 228 of a host system 244 (shown in FIG. 2C). This data can also be obtained from the manufactures of the field devices and communications network cards (e.g., I/O network cards). The invention is not limited in this regards. For example, if an IPCS is absent of communication network cards, then the simulation data records can include data defining the characteristics of communications links between Fieldbus enabled field devices and FIMs.

The microprocessor can generate simulation data describing results obtained from simulating the operations of FIMs, field devices, and/or communications network cards (e.g., I/O network cards). Such simulation data can include, but is not limited to, diagnostic data, calibration data, ranges, configurations, information, and default settings.

The user interface 302 is comprised of input devices, output devices, and software routines configured to allow a user to interact with and control software applications installed on the simulation computer system 242. Such input and output devices include, but are not limited to, a display screen (not shown), a speaker (not shown), a keypad (not shown), a directional pad (not shown), a directional knob (not shown), and a microphone (not shown). As such, the user interface 302 can facilitate a user-software interaction for simulating at least one operation of an IPCS (such as the IPCS shown in FIG. 1). The user interface 302 can facilitate a user-software interaction for viewing simulation data generated as a result of running a simulation software program.

The system interface 314 allows the simulation computer system 242 to communicate directly or indirectly with a sever 202 (described above in relation to FIG. 2C), a database 204 (described above in relation to FIG. 2C), a main controller 206 (described above in relation to FIG. 2C), a supervisory controller 228 (described above in relation to FIG. 2C), and/or an operator computer system 210. If the simulation computer system 242 is communicating indirectly with the devices 202, 204, 206, 210, 228, then the simulation computer system 242 sends and receives communications through a common communications network 208 (described above in relation to FIG. 2C).

According to an embodiment of the invention, the common communications network 208 (described above in relation to FIG. 2C) is an Ethernet network. The invention is not limited in this regard. The common communications network 208 (described above in relation to FIG. 2C) can be any wireless network such as a local area network, a wide area network, or a personal area network.

Exemplary Method for Simulating an Operation of a Fieldbus System

Figure 4A:
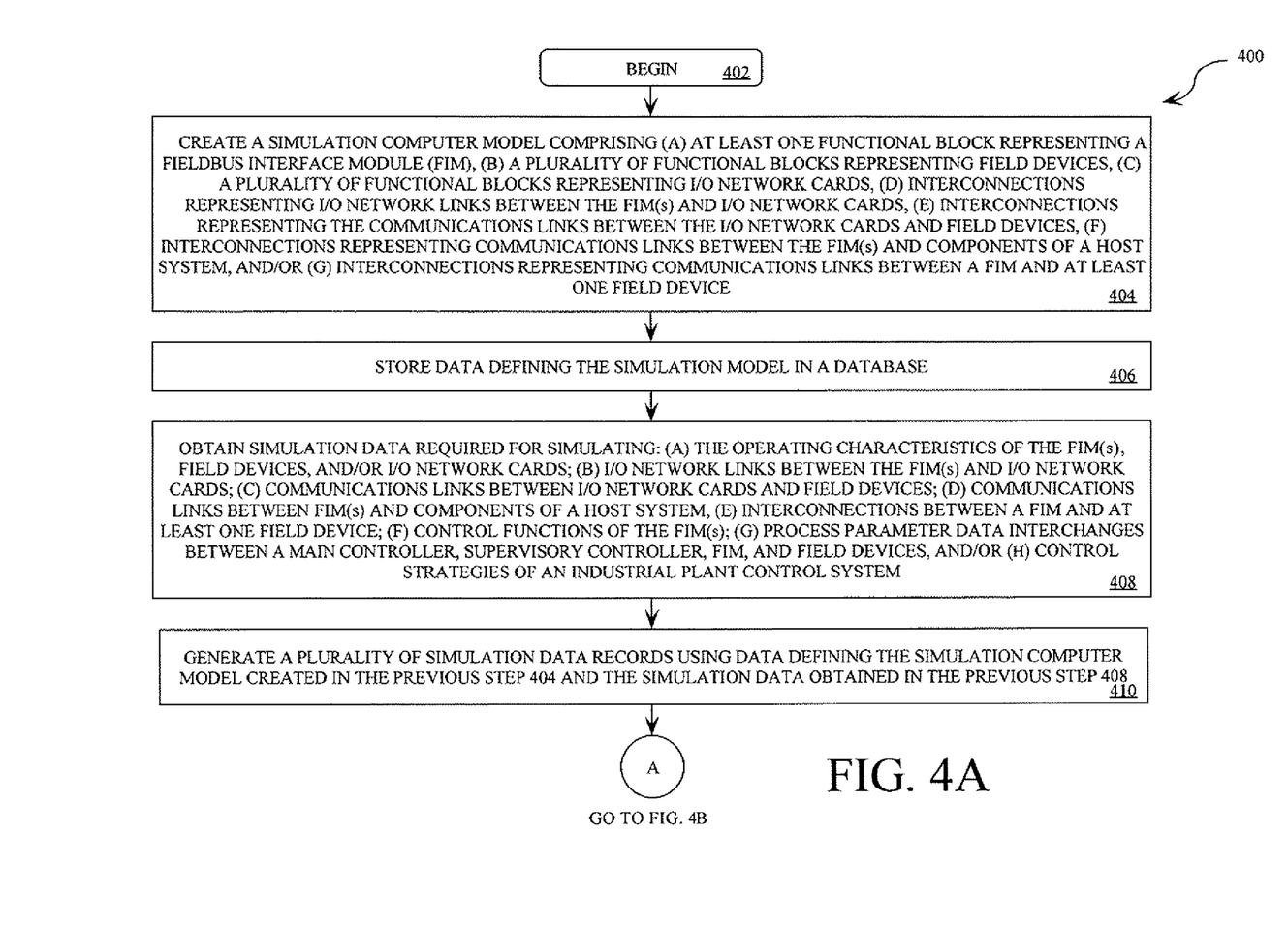
FIGS. 4A-4B collectively provide a flow diagram of a method for simulating operations of a control system.
Figure 4B:
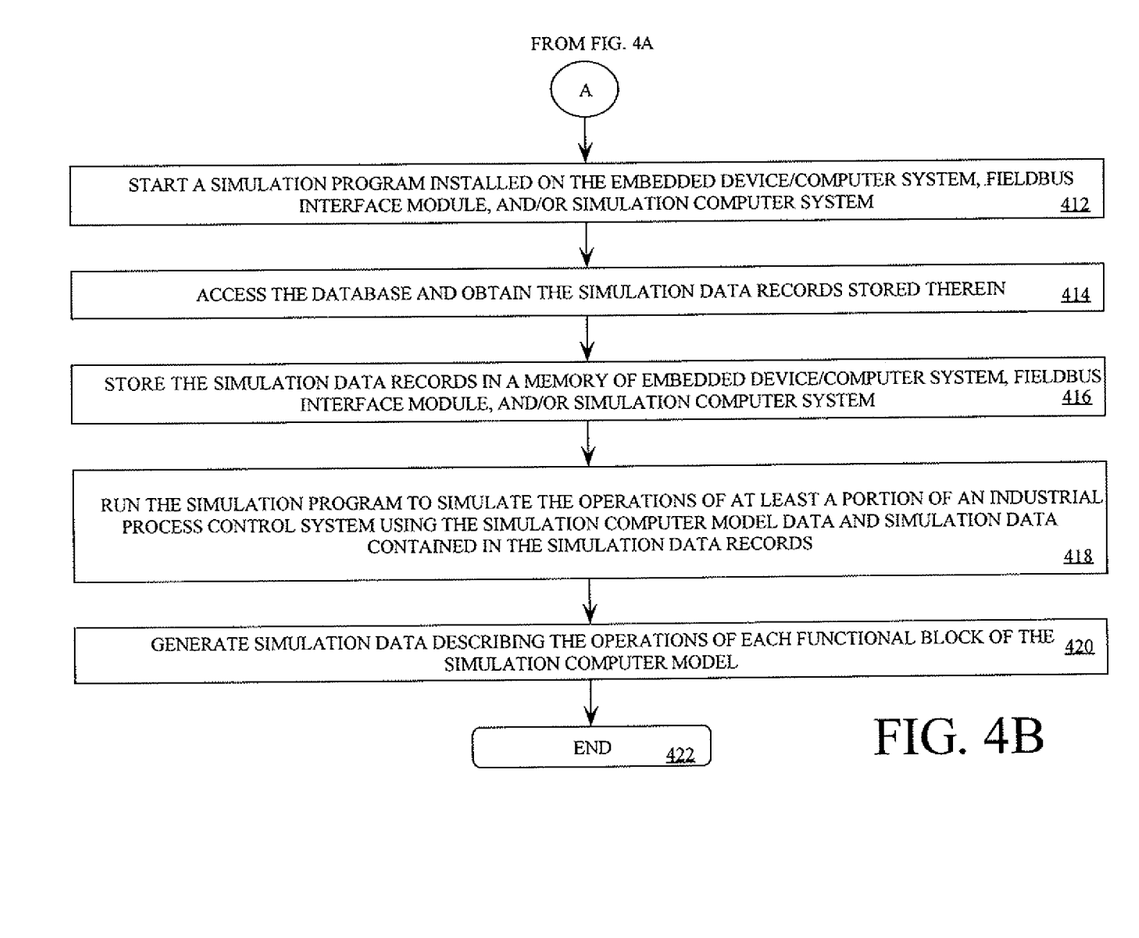

The following FIGS. 4A-4B and accompanying text illustrate a method 400 for simulating an operation of a Fieldbus system comprising at least one Fieldbus Interface Module (FIM) communicatively coupled to a plurality of field devices. It should be appreciated, however, that the method 400 disclosed herein is provided for purposes of illustration only and that the present invention is not limited solely to the method shown.

Referring now to FIG. 4, the method 400 begins at step 402 and continues with step 404. In step 404, a simulation computer model is created. The simulation computer model can comprise functional blocks representing at least one FIM, at least one field device, and/or at least one communications network card (e.g., an I/O network card). The simulation computer model can also comprise: (a) interconnections representing communication links (e.g., I/O network links) between FIM(s) and communications network cards (e.g., I/O network cards); (b) interconnections representing communications links between communications network cards (e.g., I/O network cards) and field devices; (c) interconnections representing communications links between FIM(s) and components of a host system (e.g., host systems 228, 250, and 244 of FIGS. 2A-2C); and/or (d) communications links between FIMs and field devices. Schematic illustrations of exemplary simulation computer models 500, 550 are provided in FIG. 5.

Figure 5:
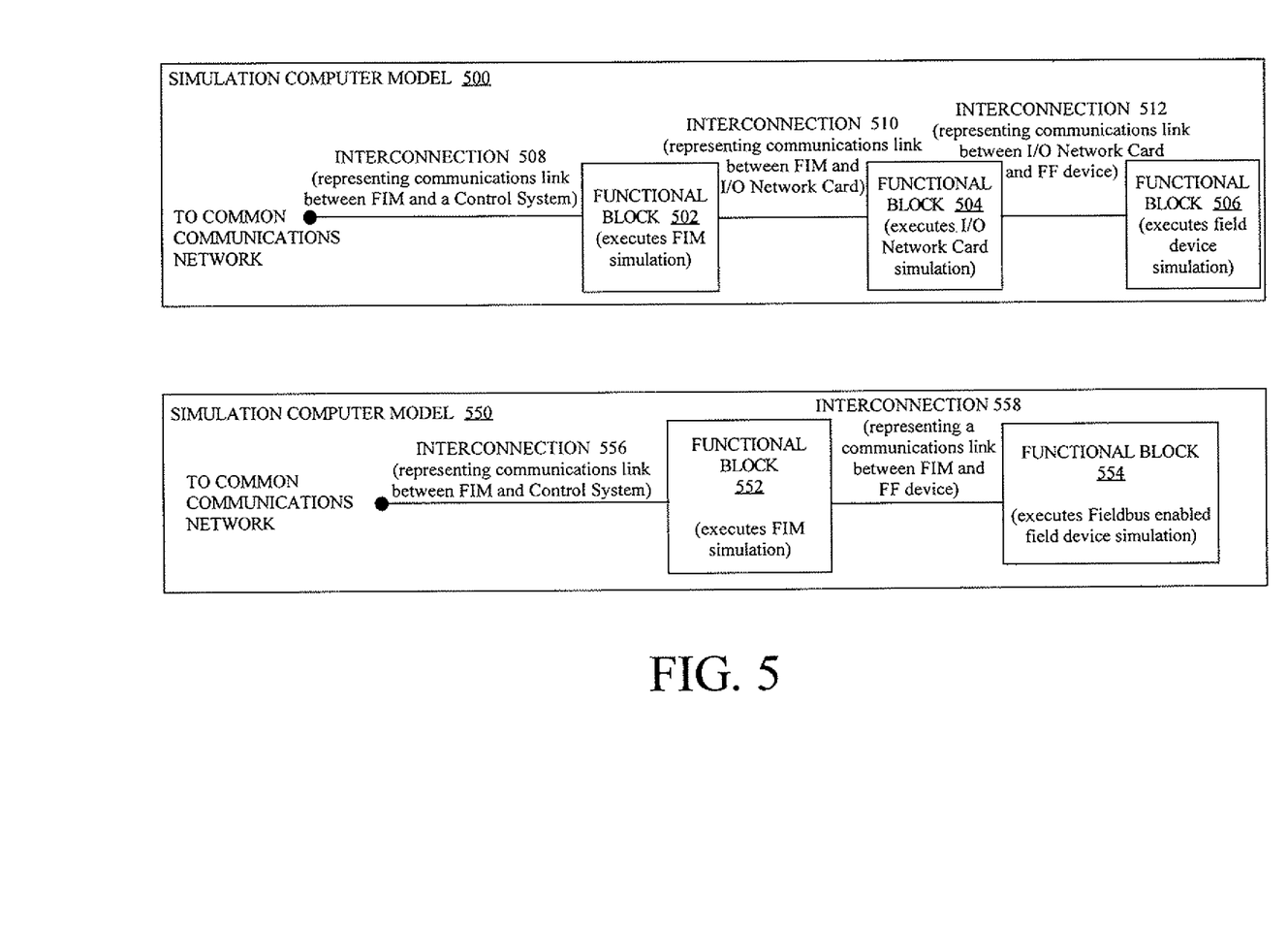
FIG. 5 is a schematic illustration of exemplary simulation computer models according to embodiments of the invention.

As shown in FIG. 5, a first exemplary simulation computer model 500 comprises a functional block 502 configured for executing a FIM simulation, a functional block 504 configured for executing an I/O network card simulation, and a functional block 506 configured for executing a field device simulation. The simulation computer model 500 also comprises an interconnection 508 representing a communications link between a FIM and a control (or host) system, an interconnection 510 representing a communications link between a FIM and an I/O network card, and an interconnection 512 representing a communications link between an I/O network card and a field device. The invention is not limited in this regard. The simulation computer model can include any number of functional blocks and interconnections selected in accordance with a particular simulation application.

As also shown in FIG. 5, a second exemplary simulation computer model 550 comprises a functional block 552 configured for executing a FIM simulation and a functional block 554 configured for executing a Fieldbus enabled field device simulation. The simulation computer model 550 also comprises an interconnection 556 representing a communications link between a FIM and a control (or host) system and an interconnection 558 representing a communications link between a FIM and a Fieldbus enabled field device. The invention is not limited in this regard. The simulation computer model can include any number of functional blocks and interconnections selected in accordance with a particular simulation application.

Referring again to FIG. 4A, the method 400 continues with step 406. In step 406, data defining the simulation computer model is stored in a database (e.g., database 204 of FIGS. 2A-2C). Subsequently, step 408 is performed. In step 408, simulation data is obtained. The simulation data includes data required for simulating the operating characteristics and device parameters of FIM(s), field devices, and/or communications network cards (e.g., I/O network cards). The simulation data can also include data required for simulating the characteristics of: (a) interconnections defining communication links (e.g., I/O network links) between FIM(s) and communications network cards (e.g., I/O network cards); (b) interconnections defining communications links between communications network cards (e.g., I/O network cards) and field devices; (c) interconnections defining communications links between FIM(s) and components of a control or host system (e.g., host systems 228, 250, and 244 of FIGS. 2A-2C); and/or (d) communications links between FIMs and Fieldbus enabled field devices.

The simulation data can further include data required to simulate control functions of a FIM (e.g, FIMs 212, 214 of FIG. 2A and FIMs 232, 234 of FIG. 2B). The simulation data can include data required to simulate process parameter data interchanges between a main controller (e.g., main controller 206 of FIGS. 2A-2C), a supervisory controller (e.g., supervisory controller 228 of FIGS. 2A-2C), FIMs (e.g, FIMs 212, 214 of FIG. 2A and FIMs 232, 234 of FIG. 2B), and field devices (e.g., field device 122, 124 of FIG. 1). The simulation data can include data defining control strategies of an IPCS (e.g., the IPCS of FIG. 1).

Subsequent to completing step 408, step 410 is performed. In step 410, a plurality of simulation data records are generated using data defining the simulation computer model created in the previous step 404 and the simulation data obtained in the previous step 408. Thereafter, the method 400 continues with a step 412 of FIG. 4B.

Referring now to FIG. 4B, step 412 involves starting a simulation program installed on an embedded device/(e.g., the ED option from ED/CS 222, 226 of FIG. 2A), a FIM (e.g., FIM 232, 234 of FIG. 2B), and/or a simulation computer system (e.g., simulation computer system 242 of FIG. 2C). After the simulation program is started, step 414 is performed. In step 414, the database (e.g., database 204 of FIGS. 2A-2C) is accessed by an embedded device, a FIM, and/or a simulation computer system. The embedded device, FIM, and/or simulation computer system retrieves at least one simulation data record from the database (e.g., database 204 of FIGS. 2A-2C) for use by a simulation software program.

After completing step 414, the method 400 continues with step 416. In step 416, the simulation data records are stored in a memory (e.g., memory 310 of FIG. 3) of a simulation computer system (e.g., simulation computer system 242 of FIGS. 2C and 3), a FIM (e.g., FIM 232, 234 of FIG. 2B), and/or a simulation computer system (e.g., simulation computer system 242 of FIG. 2C). Thereafter, step 418 is performed where a simulation software program is run. The simulation computer program can simulate certain operations of an IPCS (such as the IPCS shown in FIG. 1) using the simulation data records. Thereafter, step 420 is performed where simulation data is generated by the simulation software program. The simulation data can include diagnostic data defining the operation of the functional blocks. Subsequent to completing step 420, step 422 is performed where the method 400 ends.

In light of the forgoing description of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A method for simulating an operation of a Fieldbus system comprising at least one Fieldbus Interface Module (FIM) communicatively coupled to a plurality of field devices, comprising the steps of:

creating a simulation computer model of a Fieldbus system configuration, said simulation computer model comprising a plurality of functional blocks and a plurality of interconnections between said plurality of functional blocks, said plurality of functional blocks representing said at least one FIM and/or said plurality of field devices;

generating a plurality of simulation data records comprising data defining said simulation computer model, operating characteristics of said at least one FIM, operating characteristics of said plurality of field devices coupled to said at least one FIM, communication links between said at least one FIM and said plurality of field devices, and at least one control strategy of said Fieldbus system; and running simulation software installed on an embedded device to simulate at least one operation of said Fieldbus system using at least a portion of said simulation computer model and at least one of said plurality of simulation data records.

2. The method according to claim 1, wherein said running simulation software step further comprises generating simulation data describing results obtained from simulating said at least one operation.

3. The method according to claim 1, further comprising the step of storing said plurality of simulation data records in a storage device accessible by said embedded device.

4. The method according to claim 1, wherein said plurality of functional blocks further represent a plurality of communications network cards.

5. The method according to claim 4, wherein said simulation computer model further comprises interconnections between functional blocks representing said plurality of communications network cards and functional blocks representing said plurality of field devices.

6. The method according to claim 5, wherein said plurality of simulation data records further comprise data defining operating characteristics of said plurality of communications network cards and communication links between said plurality of communications network cards and said plurality of field devices.

7. The method according to claim 4, wherein said simulation computer model further comprises interconnections between said functional blocks representing said plurality of communications network cards and said functional block representing said at least one FIM.

8. The method according to claim 7, wherein said plurality of simulation data records further comprise data defining operating characteristics of said plurality of communications network cards and communications links between said plurality of communications network cards and said at least one FIM.

9. A Fieldbus based simulation system, comprising:
a storage device having a plurality of simulation data records stored thereon, said plurality of simulation data records comprising data defining a simulation computer model, operating characteristics of at least one Fieldbus Interface Module (FIM), operating characteristics of a plurality of field devices coupled to said at least one FIM, communication links between said at least one FIM and said plurality of field devices, and at least one control strategy;
an embedded device coupled to said storage device and configured for running a simulation software program to simulate operations of said at least one FIM and said plurality of field devices using at least a portion of said simulation computer model and at least one of said plurality of simulation data records;
wherein said simulation computer model comprises a plurality of functional blocks and a plurality of interconnections between said plurality of functional blocks, said plurality of functional blocks representing said at least one FIM and/or said plurality of field devices.

10. The Fieldbus based simulation system of claim 9, wherein said embedded device is further configured for generating simulation data describing results obtained from simulating said operations of said at least one FIM and said plurality of field devices.

11. The Fieldbus based simulation system of claim 9, wherein said plurality of functional blocks further represent a plurality of communications network cards.

12. The Fieldbus based simulation system of claim 11, wherein said simulation computer model further comprises interconnections between said functional blocks representing said plurality of communications network cards and said functional blocks representing said plurality of field devices.

13. The Fieldbus based simulation system of claim 12, wherein said plurality of simulation data records further comprise data defining operating characteristics of said plurality of communications network cards, device parameters of said plurality of communications network cards, and characteristics of communication links between said plurality of communications network cards and said plurality of field devices.

14. The Fieldbus based simulation system of claim 11, wherein said simulation computer model further comprises interconnections between said functional blocks representing said plurality of communication network cards and said functional block representing said at least one FIM.

15. The Fieldbus based simulation system of claim 14, wherein said plurality of simulation data records further comprise data defining operating characteristics of said plurality of communications network cards, device parameters of said plurality of communications network cards, and characteristics of a plurality of communications network links between said plurality of communications network cards and said at least one FIM.

16. The method according to claim 1, wherein said embedded device is communicatively coupled to a main controller of said Fieldbus system by at least one FIM.

17. The method according to claim 16, wherein said embedded device is communicatively coupled to a main controller of said Fieldbus system by coupling to at least one I/O network card, said I/O network card coupled to an I/O network, wherein said I/O network is coupled to said FIM.

18. The Fieldbus based simulation system of claim 9, wherein said embedded device is communicatively coupled to a main controller of said Fieldbus system by at least one FIM.

19. The Fieldbus based simulation system of claim 18, wherein said embedded device is communicatively coupled to a main controller of said fieldbus system by coupling to at least one I/O network card, said I/O network card coupled to an I/O network, wherein said I/O network is coupled to said FIM.

* * * * *